United States Patent Office 3,073,827
Patented Jan. 15, 1963

3,073,827
METHOD FOR PREPARING QUATERNARY ALKYL NITRATES OF DIAZABICYCLO-OCTANE
William E. Erner, Wilmington, Del., assignor to Air Products and Chemicals, Inc., a corporation of Delaware
No Drawing. Filed June 3, 1959, Ser. No. 817,712
10 Claims. (Cl. 260—268)

The present invention relates to novel methods of preparing quaternary nitrates of diazabicyclo-octane and of its homologues.

Diazabicyclo-(2,2,2)-octane, also known as triethylene diamine, is known from the literature (see for example, Ishiguro et al., Journal Pharmaceutical Society, Japan, 1955; volume 75, pages 1370-1373). More recently this compound has been made available in commercial quantities, from vapor phase cyclization of aliphatic amines over solid acid catalyst. One such method of preparation is described in the copending application of E. C. Herrick, Serial No. 628,723, filed December 17, 1956, now Patent No. 2,937,176.

While various quaternary salts of diazabicyclo-octane including dihalides have been previously described in the literature, no methods have been therein described for the specific preparation of nitrates. Quaternary dinitrates of piperazine, on the other hand, have been described (Mann and Senior, J. Chem. Soc., London 1954, 4479); made by treating N,N′-methylated piperazine with methyl iodide and treating the quaternary piperazinium diiodide with moist silver nitrate.

In accordance with one embodiment of the present invention quaternary N,N′-dialkyl diazabicyclo-octane dihalide, in moist condition, is treated with nitrogen dioxide gas ($NO_2$), thereby converting the quaternary halide salt to the corresponding nitrate salt, with the evolution of nitrosyl halide. The reaction is illustrated below:

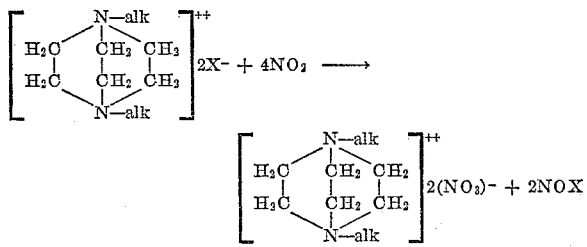

where "alk" represents an alkyl radical.

The dinitrate salt formed in this manner was found to have an appreciable content of absorbed nitric acid vapors, posing a difficult removal problem. Removal of the excess $HNO_3$ from the dinitrate salt by heating involves the risk of a violent dissociation of the compound and neutralizing the acid with ammonia entails dangerous risks from loading of the product with ammonium nitrate. These risks are avoided, in accordance with a further aspect of the invention, by effecting the removal with an aqueous formyl compound such as formic acid or formaldehyde. By the reaction of formaldehyde or formic acid with nitric acid only vapor products are formed which are completely removable by further gentle heating. Thus:

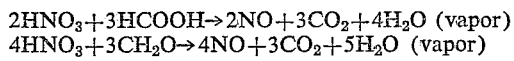

For large scale operation the vapor phase reaction with $NO_2$ is favored. For smaller installations a liquid batch operation may be preferred, as involving generally less costly equipment. For such liquid treatment, in accordance with another embodiment of the invention, concentrated nitric acid is employed of about 70% concentration (42 to 44° Bé.). Replacement of the halide anion by nitrate takes place with the release of gaseous nitrosyl halide. The nitrosyl halide as well as the nitric oxide readily go off as vapors. The slight amount of excess nitric acid absorbed in the product is readily removed by treatment with formyl compound as already described above. On the other hand, if dilute aqueous nitric acid is attempted to be employed for simple substitution of the halide ion in the quaternary halide, difficulty is encountered in freeing the product of the hydrohalide formed.

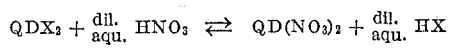

where QD is a quaternary diazabicyclo-octane cation. When using dilute nitric acid, an equilibrium (partial) displacement of halide is obtained with the resultant dilute halogen acid removable only after excess water has been volatilized. As a result, dilute acids have not yielded clean halide-free products. On the other hand, when using concentrated $HNO_3$ the simpler lower cost chlorides may be used and the halogen acid (HCl) is quite readily volatilized with 80% water at the boiling point of the constant boiling mixture (108.6° C.) or at a lower temperature when dehydrated.

The starting quaternary halide can be prepared by methods known to the art. Preferably it is prepared by heating diazabicyclo-octane with an excess of alkyl halide in solution in methanol or other low molecular weight alcohol:

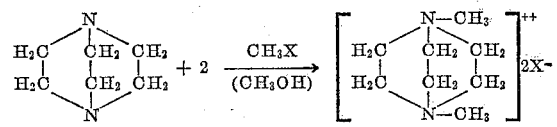

In the vapor treating method for converting the quaternary halide compound to the nitrate, the $NO_2$ gas is passed through a bed of the solid quaternary N,N′-dialkyl diazabicyclo-octane dihalide moistened with water. The reaction is exothermic, and for best results the heat of reaction should be absorbed or dissipated to keep the temperature at the desired level. The reaction with $NO_2$ proceeds through the bed until essentially all of the quaternary salt is converted to dinitrate. Essential completion of the reaction is evidenced when excess $NO_2$ (brown-red) appears in the off-gas instead of the earlier NOCl (brown-yellow). At this stage the product is aspirated or evacuated to remove residual $NO_2$ and NOCl. A sample of the product dissolved in distilled water and tested with silver nitrate solution shows only slight opalescence, indicating substantially complete replacement of the halide ions.

For removal of any absorbed $HNO_3$ vapors, obtaining clean dinitrate salt, the product is treated with formalin or concentrated formic acid—of about 90% concentration. The obtained purified product is finally oven dried at moderate temperature (<220° F.).

Instead of using $NO_2$, one can employ a mixture of NO and oxygen or air for effecting the replacement reaction.

The N,N′ - dimethyl - 1,4 - diazabicyclo - 2,2,2 - octane dinitrate obtained is useful as a high energy fuel. For the particular uses for which the dinitrate is most advantageous, this oxidizable compound is dissolved in a liquid oxidant and the combined solution must be stable both to temperature and mechanical shock under typical storage conditions. For example, a solution in red fuming nitric acid must resist autogenetic reaction for a substantial period of time at temperatures up to 160° C. On the other hand the combined oxidant-fuel mixture should be pumpable as a stable liquid, but be instantaneously and completely decomposed by reaction when brought in contact with an igniter. In decomposing at the ignition temperature, it releases comparatively large volumes of gases at high temperature including $N_2$, $CO_2$ and $H_2O$ which, in the proper engine, are powerful propellants.

The corresponding quaternary N,N'-diethyl and N,N'-dipropyl nitrates can be prepared in similar manner employing the appropriate halides, preferably chlorides. These homologues are considered less desirable as fuels.

*Example I*

(a) To a 5 gallon autoclave containing 4 kg. of diazabicyclo-octane (about 35.7 mols) and 6.7 liters of isopropanol there was added about 3.8 kg. (about 75.2 mols) of methyl chloride; addition being at the rate of 0.1 kg./hr. while the autoclave was heated to 60–70° C. by steam. Pressure in the autoclave rose to 10–12 p.s.i.g. After about 40 hours of methyl chloride addition and further standing overnight in a methyl chloride atmosphere, the autoclave was cooled and opened. The product, in the form of a white salt, was worked up into a slurry in the isopropanol and separated by filtration. The product was sucked dry on a vacuum filter. About 7.3 kg. of product were obtained.

(b) The obtained product was moistened in 100 gm. portions with 3–5% water and packed into absorption tubes through which $NO_2$ gas was passed. The treatment with $NO_2$ was continued until the exit gases were red-brown (indicating unconsumed $NO_2$) and a sample of the reaction product gave a negative chloride test with silver nitrate solution. A sample of the reaction product titrated with standard KOH solution showed 1.26% residual acidity.

(c) 426 grams of the above product, containing residual $HNO_3$, were diluted with 400 ml. water, and 175 ml. of 37% formalin were added slowly to dissociate the nitric acid. The reaction product obtained was evaporated to dryness under vacuum, yielding a solid brittle material, which was ground to a white powder in a ball mill.

*Example II*

(a) Methyl chloride gas in excess was passed into an autoclave containing diazabicyclo-octane dissolved in isopropanol (373 g./liter), the gas being admitted at 60–75° C. over a period of 1.5 hours, during which time the pressure of the autoclave was at 8–12 p.s.i.g. The reaction product was permitted to remain in the autoclave overnight under the methyl chloride atmosphere; the reactor was then opened and discharged. The product was collected on a vacuum filter and sucked dry under nitrogen atmosphere, then washed with ether and again dried by suction. The quaternary methyl chloride yield was about 85% of theory.

(b) This product was moistened with 3–5% water and packed in glass absorption vessels, through which $NO_2$ gas was slowly passed in series until the exit gases showed unabsorbed $NO_2$ and a sample of the solid reaction product gave a negative chloride test with $AgNO_3$. Titration of a sample of the reaction product with standardized base, showed a content of 0.25 ml./g. of 1 N. acid retained in the sample.

(c) The excess acid was decomposed by treatment with a slight excess of aqueous formic acid, by dissolving the quaternary nitrate compound in water to a 30% solution and adding concentrated (90%) formic acid thereto in an open vessel while heating and stirring on a hot water bath until the brown-red $NO_2$ fumes were no longer given off. The solution was then evaporated to dryness and further dried under vacuum at 105–115° C. for 36 hours.

*Example III*

(a) The quaternary diazabicyclo-octane dimethyl dichloride was prepared as in Example I(a).

(b) To 413 grams of the quaternary dimethyl dichloride compound from (a), there was added 650 ml. of 70% $HNO_3$. When the reaction subsided, the solution was boiled on a hot plate until the volume was reduced to 500 ml. At this point, a sample of the product when tested gave a slightly positive chloride test with $AgNO_3$.

(c) An additional 200 ml. of 70% $HNO_3$ was then admixed and boiling continued until the silver nitrate test of a sample of the reaction product showed only slight opalescence.

(d) To the obtained product from (c) above, there was added 400 ml. of water, followed by the dropwise addition of formalin until nitrogen oxide fumes were no longer evolved. After this decomposition of excess nitric acid, the preparation was boiled until crystals began to appear. The composition was then dried in a vacuum oven. A white crystalline solid product was obtained.

While the anhydride of nitric acid is generally regarded as $N_2O_5$ rather than $NO_2$, it is believed that in the use of concentrated nitric acid in the reaction with the quaternary halide, the nitric acid behaves in a manner similar to $NO_2$ in providing nitrate ions and in releasing nitrosyl halide, probably in accordance with the following indicated equilibria:

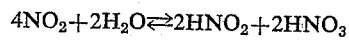

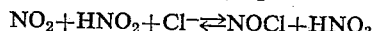

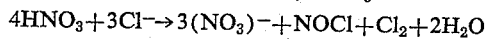

Thus, in reacting the quaternary methyl halide compound with concentrated nitric acid, the nitrosyl chloride and other halide components formed go off readily in gaseous state. In similar manner $NO_2$ when reacted with the quaternary methyl halide in the presence of moisture, releases nitrosyl chloride with probable intermediate formation of nitrous acid.

*Example IV*

In the same manner as described in Example III above, 426 grams of quaternary diazabicyclo-octane dimethyl dichloride were reacted initially with 650 ml. of 70% nitric acid, the reaction product concentrated by boiling and followed by addition of a further 100 ml. of the nitric acid. Decomposition of the excess $HNO_3$ with formalin solution was carried out as before. The final product yield was 517 grams; or 97.2% of the theoretical yield.

While use of the quaternary alkyl chlorides is preferred for reasons pointed out above, the $NO_2$ or concentrated $HNO_3$ reaction can be carried out using the corresponding quaternary alkyl bromides and iodides in substantially the same manner set out above in the case of the chlorides. Other short chain alkyl halides can be substituted for methyl halide to form, for example, the analogous ethyl and propyl quaternary halides, and the latter reacted with $NO_2$ or concentrated nitric acid in the manner described, leading to formation of the corresponding quaternary nitrates.

Obviously many modifications and variations of the invention as hereinbefore set forth may be made without departing from the spirit and scope thereof and therefore only such limitations should be imposed as are indicated in the appended claims.

What is claimed is:

1. The method of making quaternary N,N'-dialkyl nitrates of diazabicyclo-octane which comprises treating the corresponding quaternary N,N'-dialkyl halides in moistened solid condition with an oxy-nitrogen compound selected from the group consisting of concentrated nitric acid and $NO_2$ gas, thereby effecting evolution from the field of reaction of a vapor product comprising nitrosyl halide.

2. The method according to claim 1 wherein the obtained N,N'-dialkyl nitrate is dissolved in water, the obtained aqueous solution is further treated with concentrated formic acid to decompose residual nitric acid therein to volatile gases and removing said volatile gases from the solution by gentle heating.

3. The method of making quaternary N,N'-dimethyl diazabicyclo-octane dinitrate which comprises passing NO₂ vapors through moistened solid quaternary N,N'-dimethyl diazabicyclo-octane dihalide thereby effecting evolution of a vapor product comprising nitrosyl halide.

4. The method of making quaternary N,N'-dimethyl diazabicyclo-octane dinitrate which comprises reacting the corresponding N,N'-dialkyl dihalide with nitric acid of about 70% concentration, thereby effecting evolution of a vapor product comprising nitrosyl halide.

5. The method according to claim 4 wherein said dihalide is a dichloride.

6. The method of making quaternary N,N'-dimethyl diazabicyclo-octane dinitrate which comprises reacting N,N'-dimethyl diazabicyclo-octane dichloride in moist state with a gaseous mixture containing NO and oxygen.

7. The method which comprises passing NO₂ in gaseous state through N,N'-dimethyl diazabicyclo-octane dichloride as a moist solid, thereby effecting evolution of a vapor product comprising nitrosyl chloride, and treating the remaining solid product with an aqueous solution of a formyl compound from the group consisting of formaldehyde and formic acid, thereby effecting removal of any adsorbed HNO₃ impurities by decomposition to volatile gaseous products.

8. The method according to claim 7 wherein said formyl compound is formaldehyde.

9. The method which comprises reacting N,N'-dimethyl diazabicyclo-octane dichloride at ambient temperature with concentrated nitric acid of about 70% concentration, thereby effecting evolution of a vapor product comprising nitrosyl chloride and treating the remaining solid product with an aqueous solution of a formyl compound from the group consisting of formaldehyde and formic acid for removal of any adsorbed HNO₃ impurities by decomposition to volatile gaseous products.

10. The method according to claim 9 wherein said formyl compound is formaldehyde.

References Cited in the file of this patent

FOREIGN PATENTS

| | | |
|---|---|---|
| 159,562 | Australia | Nov. 2, 1954 |
| 735,631 | Great Britain | Aug. 24, 1955 |
| 798,488 | Great Britain | July 23, 1958 |

OTHER REFERENCES

Mann et al.: Jour. Chem. Society, 1954, pages 4476–4480.